United States Patent [19]

Frei et al.

[11] Patent Number: 5,344,096
[45] Date of Patent: Sep. 6, 1994

[54] SAFETY BELT RESTRAINING SYSTEM FOR VEHICLES

[75] Inventors: Bernhard Frei, Waldstetten; Uwe Hirzel, Backnang; Martin Röhrle, Mutlangen; Wolf-Dieter Hönl, Böbingen, all of Fed. Rep. of Germany

[73] Assignee: TRW Repa GmbH, Alfdorf, Fed. Rep. of Germany

[21] Appl. No.: 19,368

[22] Filed: Feb. 17, 1993

[30] Foreign Application Priority Data

Feb. 20, 1992 [DE] Fed. Rep. of Germany ... 9202219[U]

[51] Int. Cl.$^5$ .............................................. B60R 22/42
[52] U.S. Cl. ..................................... 242/379; 280/805; 280/806; 242/381.1; 242/382.1; 242/384
[58] Field of Search ...................... 242/107.2, 107.4 R, 242/107. A, 107.4 B; 280/806, 805; 297/478, 480

[56] References Cited

U.S. PATENT DOCUMENTS

| | | | |
|---|---|---|---|
| 4,381,086 | 4/1983 | Pfeiffer | 280/805 X |
| 4,451,062 | 5/1984 | Ziv | 280/806 |
| 4,615,540 | 10/1986 | Sedlmayr et al. | 242/107.2 X |
| 4,948,199 | 8/1990 | Weller | 280/805 X |
| 4,949,995 | 8/1990 | Haland et al. | 280/805 |
| 5,029,896 | 7/1991 | Ernst | 280/806 |
| 5,154,368 | 10/1992 | Fujimura et al. | 242/107.2 |
| 5,174,604 | 12/1992 | Numazawa et al. | 242/107.2 X |
| 5,211,694 | 5/1993 | Sakakida | 280/806 |

FOREIGN PATENT DOCUMENTS

| | | |
|---|---|---|
| 0487760 | 6/1992 | European Pat. Off. . |
| 2460163 | 6/1976 | Fed. Rep. of Germany . |
| 3330938 | 3/1984 | Fed. Rep. of Germany . |
| 3421837 | 12/1985 | Fed. Rep. of Germany . |
| 2216773 | 10/1989 | United Kingdom . |
| 8809274 | 1/1988 | World Int. Prop. O. . |

OTHER PUBLICATIONS

European Search Report EP 93102138.
International Publication No. WO 88/09274 published DEc. 1, 1988 corresponding to U.S. Pat. No. 5,029,896.

*Primary Examiner*—John M. Jillions
*Attorney, Agent, or Firm*—Tarolli, Sundheim & Covell

[57] ABSTRACT

The invention relates to a safety belt restraining system for vehicles comprising a belt retractor 10 and a webbing clamping means 12 arranged downstream of the retractor 10 and having two clamping wedges 46, 48 which are arranged opposite each other in a housing on either side of the webbing 22. The belt retractor 10 blockable in vehicle-sensitive and/or webbing-sensitive manner and the webbing clamping means 12 are connected together by connecting means 60, 62. With plastic deformation they yield and permit a limited moving of the webbing clamping means 12 away from the belt retractor 10 when the force exerted on the webbing 22 exceeds a predetermined value.

5 Claims, 6 Drawing Sheets

SAFETY BELT RESTRAINING SYSTEM FOR VEHICLES

BACKGROUND OF THE INVENTION

The present invention relates to a safety belt restraining system for vehicles, comprising a belt retractor with a frame and a webbing clamping means arranged downstream of the retractor and having two clamping wedges which are arranged opposite each other in a housing on either side of the webbing.

In such a system, which for example is known from DE-OS-3,330,938, the webbing clamping means serve the purpose of eliminating or at least reducing the film reel effect on blocking of the belt retractor activated in vehicle-sensitive or webbing-sensitive manner, said effect being the cause for the withdrawal of a few centimeters of webbing length by tightening of the webbing coil after blocking of the webbing reel in conventional belt retractors. Furthermore, the webbing clamping means relieves the belt retractor so that the latter can be dimensioned for small mechanical loads.

Webbing clamping means must be able to take up a very large force exerted on the webbing over their relatively small longitudinal extent in the direction of the webbing path. Consequently, in the event of a vehicle collision the webbing is subjected to extremely high loads in the region of the engagement of the clamping means. However, in normal vehicle operation as well, the webbing can be subjected to loads by the webbing clamping means. For it is desirable to keep the response threshold of the webbing clamping means as low as possible to ensure that said clamping means functions as early as possible in the event of a vehicle collision. However, with a low response threshold even in normal vehicle operation the webbing is frequently, usually at the same point, acted upon by the webbing clamping means and in the course of time can be damaged in a manner affecting safety.

The known construction of the webbing clamping means with clamping wedges arranged on either side of the webbing is able to reduce said stresses because the clamping wedges thereof move synchronously to each other so that no relative movement stressing the webbing takes place between them and the webbing is loaded symmetrically on both sides. However, in practical use the webbing nevertheless tears at stresses which lie substantially below the static tearing resistance of the webbing.

SUMMARY OF THE INVENTION

According to the present invention the frame of the belt retractor is connected to the housing of the webbing clamping means by connecting means which yield with plastic deformation and permit a limited moving of the webbing clamping means away from the belt retractor when the force exerted on the webbing exceeds a predetermined value. The moving of the webbing clamping means away from the belt retractor with simultaneous plastic deformation of the connecting means is utilized to diminish the load peaks in the belt system, the relatively small elongation of the system not only being harmless but even desired. The belt reel blocked in the course of the plastic deformation of the connecting means takes up tensile forces which exceed the maximum forces which the webbing clamping means is designed to take up. The force introduction into the restraining system is then distributed particularly uniformly along the webbing. The belt reel and its mounting, as well as the webbing clamping means, can be given substantially weaker dimensions than in conventional solutions and thus made with low weight and low costs. The belt reel and the webbing clamping means may be made up in constructional kit system to meet various demands on the safety belt restraining system.

With a preferred embodiment the clamping faces of the clamping wedges, which preferably have a friction-enhancing structure, dig into the webbing material on their side facing the belt retractor to a greater extent than on the other side. On the latter particularly strongly tensile-stressed side, on suitable choice of the angle between the clamping faces, only small transverse forces act on the webbing, or even none at all, and as a result any tendency to tear due to the aforementioned reasons is eliminated. The fact that the transverse forces occurring in the further course of the webbing between the clamping wedges gradually increase towards the belt retractor is not detrimental because at the same time the tensile stress decreases. Due to bilaterally symmetrical transverse loading of the webbing, which increases to the same extent as the tensile load decreases, a considerable increase of the dynamic tearing strength of the belt retractor can be achieved.

It is advantageous, if the clamping faces extend in the rest position substantially parallel to the direction of the webbing withdrawal. On the next contact with the webbing, the clamping faces first extend parallel to each other and to the webbing, so that the weak but relatively frequent initial tearing stresses on the webbing when the webbing clamping means responds are distributed over as large an area as possible and a good entraining effect is achieved for the clamping wedges.

The subject matter of the other subclaims form advantageous embodiments.

BRIEF DESCRIPTION OF THE DRAWINGS

Further features and advantages of the invention will be apparent from the following description of several embodiments and from the drawings, to which reference is made and in which:

FIG. 3 is a schematic sectional view of the webbing clamping means with double clamping wedge according to FIG. 1;

DESCRIPTION OF THE PREFERRED EMBODIMENT

Figure 1:
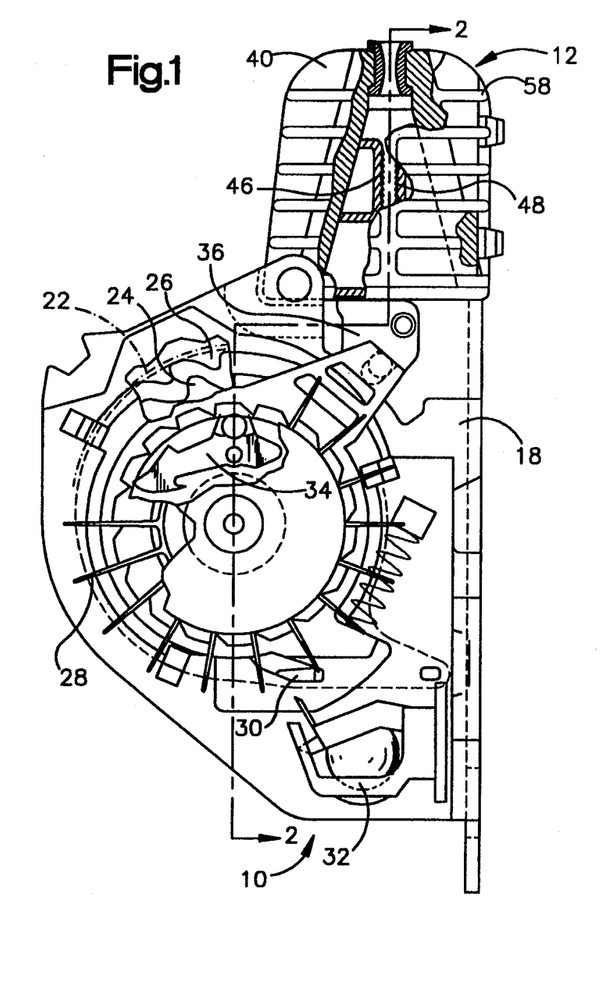
FIG. 1 shows a partially sectioned side view of an embodiment of the belt retractor having following webbing clamping means with double clamping wedge.
Figure 2:
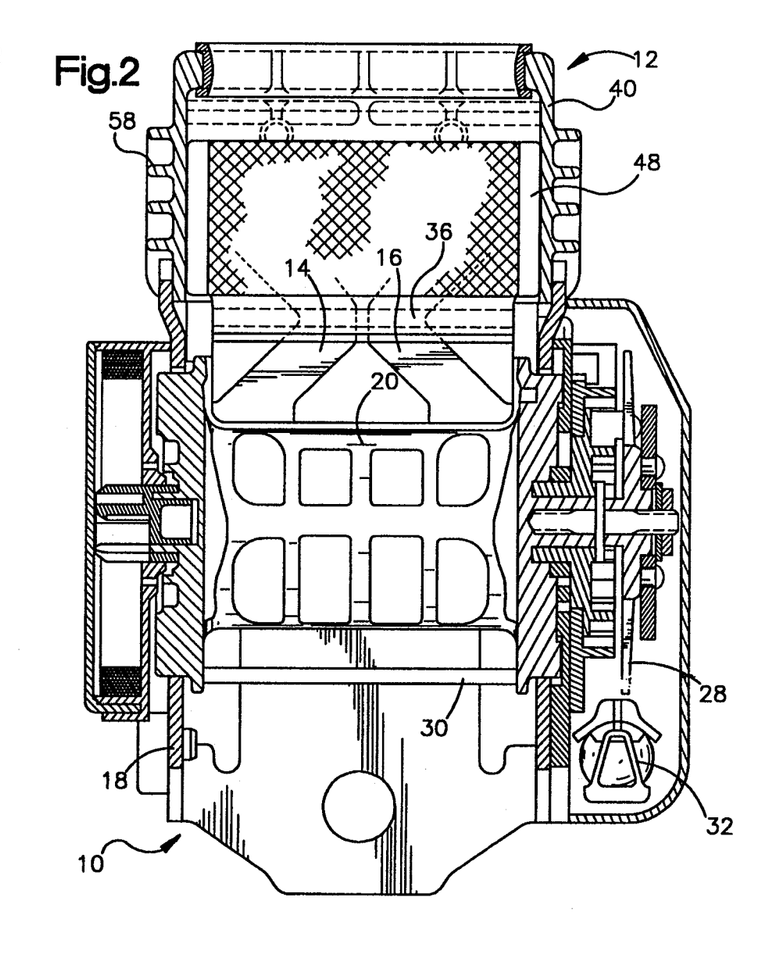
FIG. 2 is a sectional view of this embodiment along the line II—II of FIG. 1.

In the embodiment shown in FIGS. 1 and 2 a generally known belt retractor denoted generally by 10 and a webbing clamping means denoted generally by 12 are connected together via webs 14 and 16.

The belt retractor 10 comprises a U-shaped housing 18 in the side legs of which a belt reel 20 is mounted so that it can yield radially. A webbing 22 is partially coiled onto the belt reel 20 and extends centrally (not shown) through the webbing clamping means 12. Lateral blocking gears 24 are integrally formed on the belt reel 20 and on deflection of the belt reel 20 cooperate with blocking teeth 26 which are disposed in openings of the side legs of the housing 18. A control disc 28 having star-like teeth is also rotatably mounted on one of the blocking gears 24. In known manner, said control disc 28 controls a blocking pawl 30 partially in engagement with the blocking gears 24 when a vehicle-sensitive ball sensor 32 responds to a vehicle retardation or an inertia sensor 34, not shown in detail, responds to webbing withdrawal. On further webbing withdrawal the blocking gears 24 engage into the blocking teeth 26 so that the belt reel 20 is blocked with respect to rotation in the belt withdrawl direction. Simultaneously with the activation of the blocking pawl 30 the control disc 28 deflects a deflecting lever 36 mounted on the housing 18 in the direction towards the webbing clamping means 12.

The construction of the webbing clamping means 12 is best seen from FIG. 3. A clamping housing 40 surrounds the webbing 22 and is provided on its inner side with two support surfaces 42 and 44 which converge in laterally inverted symmetry and in the webbing withdrawal direction G with respect to the webbing plane. Between each support surface 42 and 44 and the webbing 22 a respective clamping wedge 46 and 48 is disposed. The two clamping wedges 46 and 48 are made in laterally inverted symmetry with respect to the webbing plane. In the state of rest of the restraining system springs, which are not shown, ensure that the clamping wedges 46, 48 are at a distance from the webbing 22, clamping faces 50, 52 of the clamping wedges 46, 48 facing the webbing 22 extending parallel to each other and to the direction G of the webbing withdrawal. The clamping faces 50, 52 are structured to promote friction, preferably being equipped with teeth, the pitch of which is adapted to the structure and stretching behaviour of the webbing 22 to ensure a reliable engagement into the webbing 22 which however at the same time is gentle on the material. The rear sides of the clamping wedges 46 and 48 remote from the webbing 22 are slide faces 54 and 56, respectively, which slide along a respective one of the support surfaces 42, 44 of the clamping housing 40 when the clamping wedges 46, 48 are moved by the deflecting lever 36 in the belt withdrawal direction G. The teeth of the clamping faces 50, 52 dig into the webbing material. The angles which support surfaces 42, 44 and the slide faces 54, 56 make with the belt withdrawal direction G are so chosen that every following webbing withdrawal leads to automatic blocking of the clamping wedges 46, 48 so that the webbing 22 is fixed with respect to the webbing clamping means 12. For an easily moving engagement of the clamping wedges 46, 48 the support surfaces 42, 44 and the slide faces 54, 56 may be provided with a sliding coating.

For a smooth transmisssion of the tensile forces acting on the webbing 22 onto the webbing clamping means 12 the angle enclosed by the two slide faces 54, 56 when their clamping faces are parallel to the webbing surface is somewhat smaller than the angle enclosed by the support surfaces 42, 44. In the example of embodiment illustrated the angle between the slide faces 54 and 56 is about 27° whilst the angle between the support surfaces 42 and 44 is about 26° when the clamping faces 50, 52 extend parallel to the webbing 22 in the rest state. Thus, between a respective slide face 42, or 44 and the associated supporting surface 54 or 56 there is a difference angle α of about half a degree. On activation of the webbing clamping means 12 the portions of the clamping faces 50, 52 adjacent the belt retractor 10 thus dig into the webbing material to a greater extent that their positions disposed in the webbing withdrawal direction. The pressure and thus the force transmission between the webbing 22 and the webbing clamping means 12 therefore continuously decrease in the belt withdrawal direction G. In the ideal case, the difference angle will be chosen in accordance with the thickness and stretching of the webbing material and the dimensions of the webbing clamping means 12 in such a manner that at the end of the clamping faces 50, 52 disposed in the belt withdrawal direction G no force transmission, or only a relatively low force transmission, takes place between the webbing 22 and the webbing clamping means 12. As a result, in this region practically no transverse stresses act on the webbing 22 of the type which in conventional webbing clamping means because of the highest tensile stress on the webbing from this point onwards promote a tendency of the webbing to tear precisely at this point.

Due to the symmetrical configuration of the clamping wedges 46, 48 when the webbing clamping means 12 is loaded no relative movement takes place in the direction of the webbing path between them and this also has a favourable effect on the loadability of the webbing 22. To ensure that no wear impairing operational reliability takes place in normal operation either, i.e. when the clamping wedges 46, 48 are activated more or less frequently and engage the webbing 22, the clamping wedges 46, 48 are preferably activated jointly. Since the clamping faces 50, 52 extend parallel to the webbing 22 until contact therewith, a gentle entraining of the clamping wedges 46, 48 by the webbing 22 in the withdrawal direction G thereof takes place as soon as further webbing withdrawal occurs. To activate the clamping wedges 46, 48, the deflecting lever 36 may be correspondingly formed or the clamping wedges 46, 48 may be connected together in form-locking manner in a way not shown in the drawings, for instance by guides engaging laterally over the webbing, so that they always move jointly in the webbing withdrawal direction G.

To ensure that the clamping faces 50, 52 in the rest state are held parallel to the webbing 22 and especially the slide faces 54, 56 make surface contact with the support surfaces 42, 44 on high loads, as during a vehicle collision, a rib 402, 404 and a groove 406 and 408 are provided in each support surface 42, 44. This design is clearly shown in FIG. 4, wherein due to clarity only half of the clamping housing 40 is shown.

Figure 4:
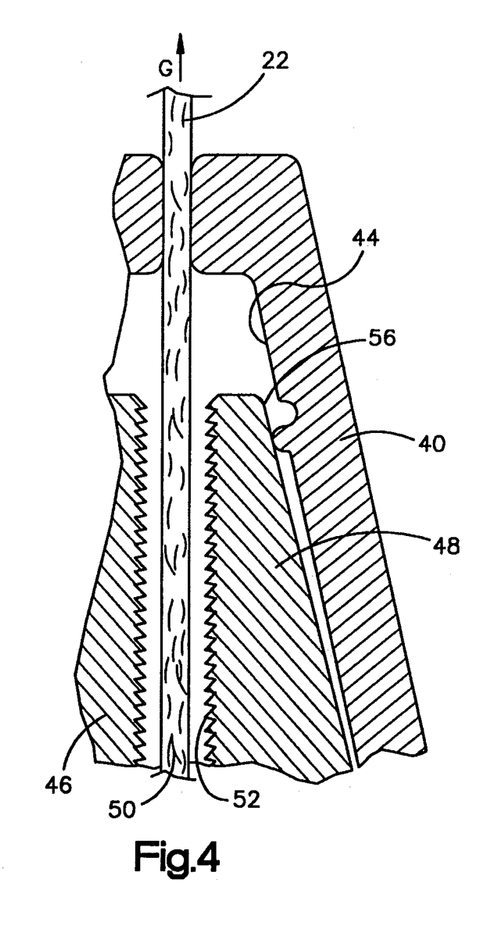
FIG. 4 is a schematic detail sectional view of the webbing clamping means according to FIG. 3.

On small loads the clamping face 56 is led onto the rib 404 and thus the clamping faces 50, 52 are held parallel to the webbing 22. On operation of the clamping means 12, the clamping face 52 engages the webbing 22 with its complete face, so that this one is loaded constantly by the complete clamping face 52. The same applies to the clamping wedges 46 and the rib 402.

For instance, in a vehicle collision during which high loads occur, the clamping wedge 48 is led first in the directon G of the belt withdrawal so that the clamping face 52 abuts the webbing 22. By increase of the load the clamping wedge 48 forces the rib 404 into the adjacent groove 408 by means of plastic deformation. Then the slide face 56 makes surface contact with the support surface 44 and an open acute angle between the clamping face 52 and the webbing 22 results. A corresponding synchronous procedure on a high load also results with repect to the clamping wedge 46 which forces the rib 402 into the groove 406 by plastic deformation.

Figure 5:
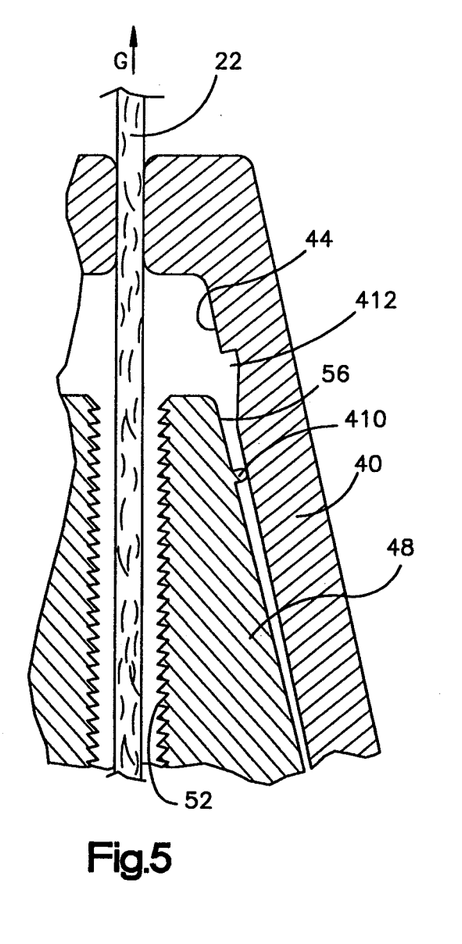
FIGS. 5 and 6 show a schematic detail sectional view of further embodiments of a webbing clamping means.
Figure 6:
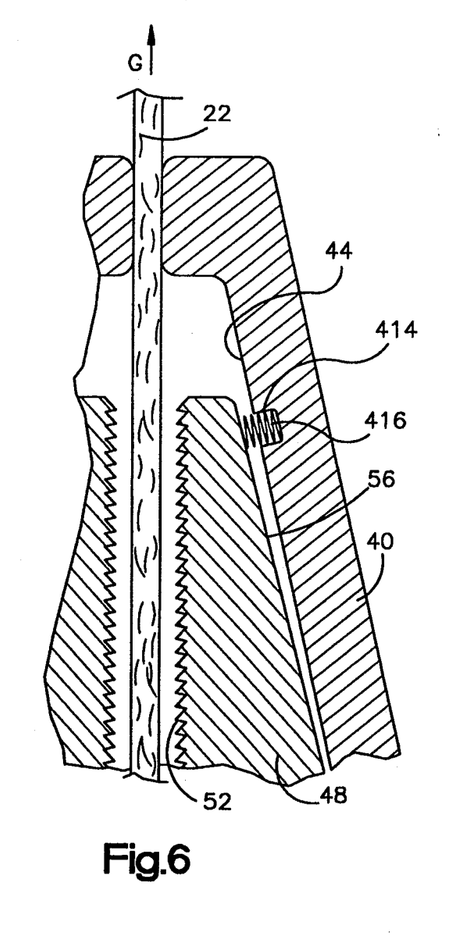

Alternatively to those shown in FIGS. 3 and 4, the embodiments shown in FIGS. 5 and 6 can be used.

According to FIG. 5 a rib 410 is arranged on the clamping wedge 48 on the slide face 56, so that the clamping wedge 48 is supported by the clamping housing 40 by means of the rib 410. In the clamping housing 40 in the support surface 44 is a recess 412. The recess 412 is designed like a ramp and arranged with distance to the rib 410. The distance and the ramp design are chosen if the clamping face 54 abuts the webbing 22, so that the rib 410 dips into the recess 412 during the compression of the webbing 22. The clamping wedge 46 and the support surface 42 comprise a corresponding design which is not shown to simplify matters. Through this embodiment the rib 410 will not be destroyed under high loads.

Another embodiment shown in FIG. 6 comprises a spring 414 and a cavity 416 for the change of the angle of the clamping wedges 46 and 48 over the webbing 22. The cavity 416 is arranged in the support surface 44 of the clamping housing 40 and the spring 414 abuts the slide face 56 of the clamping wedge 48. The spring 414 is dimensioned to be forced into the cavity 416 by the clamping wedge 48 when a predetermined load has been exceeded. Then the slide face 56 makes surface contact with the support surface 44 if the spring 414 is totally forced into the cavity 416 by the clamping wedge 48. A corresponding arrangement and design of the spring 414 and the cavity 416 is also provided in the other clamping wedge 46, to allow a synchronous movement of both clamping wedges 46 and 48.

In tests, with the webbing clamping means described depending on the webbing material with a static tearing strength of about 24 KN dynamic tearing strengths of up to 20 KN were achieved. It was found that the dynamic tearing strengths lie considerably closer to the maximum static tearing strengths which can be theoretically expected than is the case with known clamping means. In addition, the webbing clamping means prove to be insensitive to soiling of the belt with oil, grease, cavity preservation substances and other substances, because the presence thereof did not reduce the tearing strength or lead to a greater webbing withdrawal under load.

The webbing clamping means described thus clamps the webbing in a reliable and at the same time gentle manner. Only a few of the numerous possibilities of producing said webbing clamping means with low weight and low costs at the same time will be mentioned: The clamping wedges 46, 48 may be made of plastic, by alloy die-casting or from hollow metal sections. The clamping housing 40 preferably consisting of steel or sintered material may also be made by Al or Zn die-casting. Ribs 58 visible in FIG. 1 serve to stiffen the clamping housing 40.

Figure 7:
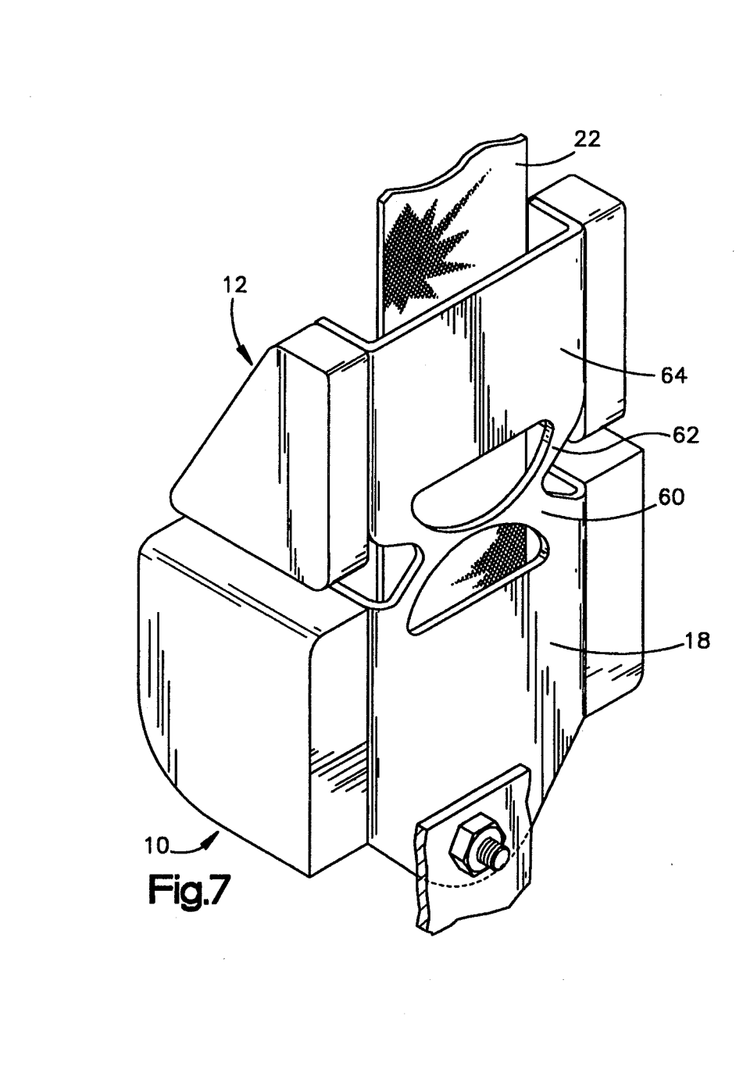
FIG. 7 is a perspective view of a belt retractor and a webbing clamping means connected thereto via plastically deformable connecting means in the state before occurrence of a high load.
Figure 8:
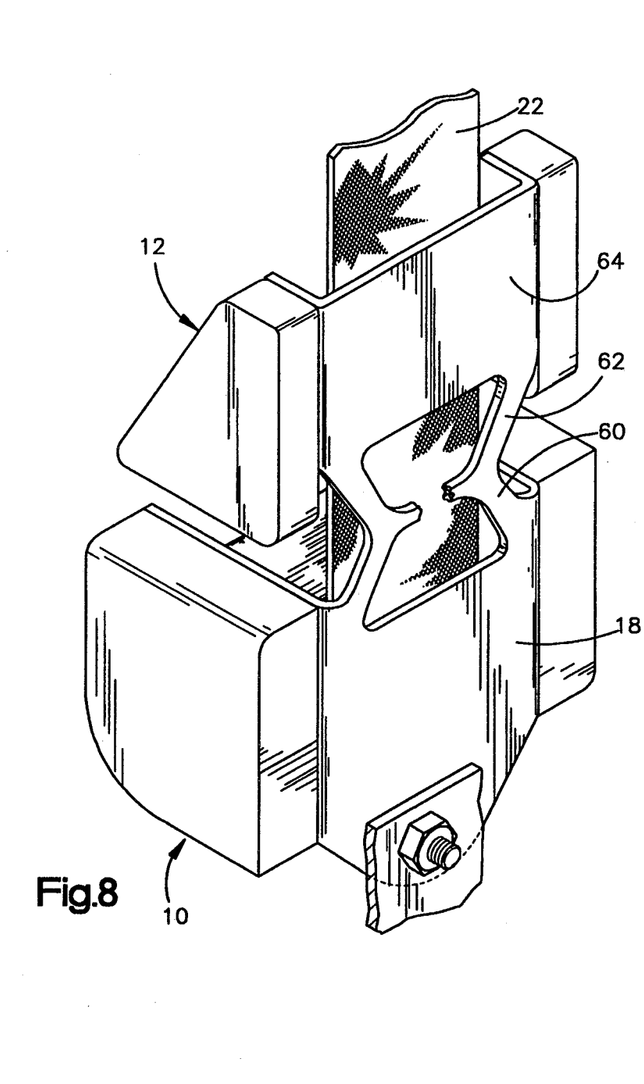
FIG. 8 shows the system illustrated in FIG. 4 after occurrence of a high load.

With reference to FIGS. 7 and 8, firstly the construction and function of the webs 14 and 16 will be explained, which are only partially visible in FIG. 2 and connect the belt retractor 10 and the webbing clamping means 12 together. In the embodiment of the safety belt restraining system illustrated there the housing 18 of the belt retractor 10 is connected via an arcuate web 60 to an oppositely curved web 62 of the housing 64 of the webbing clamping means 12. The webs 60, 62 merge together at their apex portions and at their free ends are each joined to the associated housing. The width of the arcuate legs 60, 62 is smallest in the region of their peaks in order to form a zone susceptible of breaking under load. When the predetermined value up to which the webbing blocking is to be effected solely by the webbing clamping means is reached, the webs 60, 62 begin to deform plastically. The housings 18, 64 then move away from each other. From a predetermined load value onwards the webs 60, 62 tear off at their joint in the region of their peaks. The remaining web portions are further stretched until substantially the state shown in FIG. 8 is reached. The distance D which the two housing 18, 64 have moved away from each other suffice to move the blocking gears 24 of the belt reel 20 into engagement with the housing-fixed blocking teeth 26.

Fundamentally, the webs 14 and 16 of FIGS. 1 and 2 deform under elevated load in the manner explained in conjuction with FIGS. 7 and 8. The difference is that the webs 14 and 16 are angled extensions of the housing 18 of the belt retractor which are connected to the webbing clamping means 12 for example via rivets 66. The two webs 14 and 16 here are not connected together via a desired breakage point because they are relatively wide and are stiffer from the start.

Figure 9:
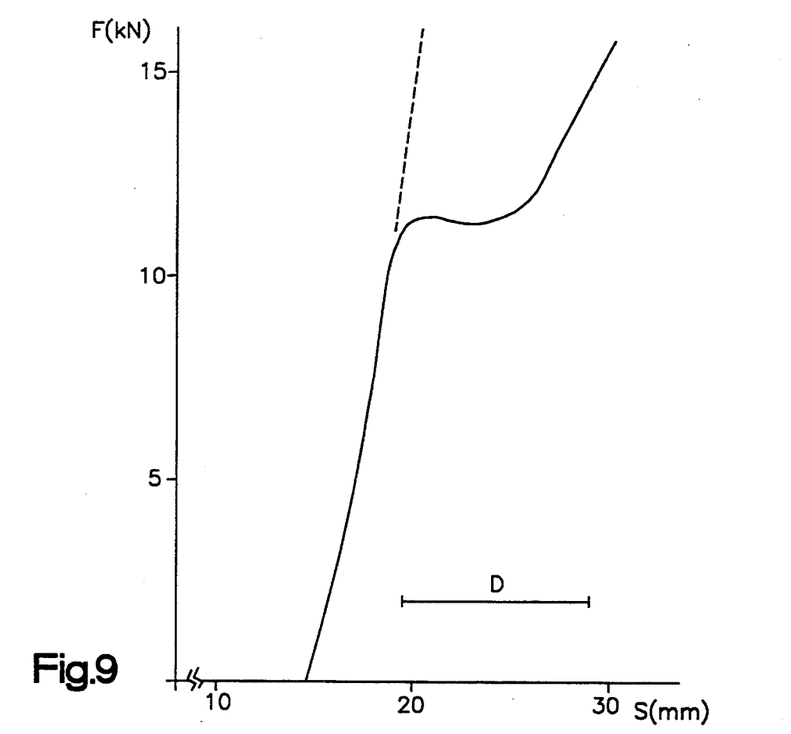
FIG. 9 shows the fundamental force profile on the webbing as a function of the webbing elongation in a system according to FIGS. 1 and 2 and 4 and 5.

In the plastic deformation of the webs 14, 16, and 60, 62 work is done, i.e. energy is absorbed, and as a result load peaks in the belt system are diminished in desired manner. The energy absorbtion takes place substantially in the course of the distance D shown in FIG. 9, S being the total webbing elongation including the housing deformation of the system. The graph shown in FIG. 9 illustrates the force acting on the webbing as a function of the webbing elongation s in a system according to FIGS. 1 and 2 or 7 and 8. The far steeper force profile for a stationary webbing clamping means is illustrated in dashed line.

The distance D utilized for the energy absorption may be up to about 50 mm and preferably so chosen that the webbing clamping means 12 is not loaded beyond a critical value inherent therein and forces going beyond this are taken up by the belt retractor 10, account having to be taken of the film reel effect corresponding to these forces. The further webbing withdrawal taking place due to this film reel effect is however appreciably less than with a system without webbing clamping means and is even desirable for the gradual force introduction into the system according to FIG. 9 because further energy absorption takes place. Since force peaks do not occur, it is also possible to use economical and light system elements. For instance, the belt reel and/or its supporting shaft or the clamping wedges may be of plastic.

The plastically deformable connecting means may be constructed in quite different ways. Some advantageous constructions will be described below.

Figure 10:
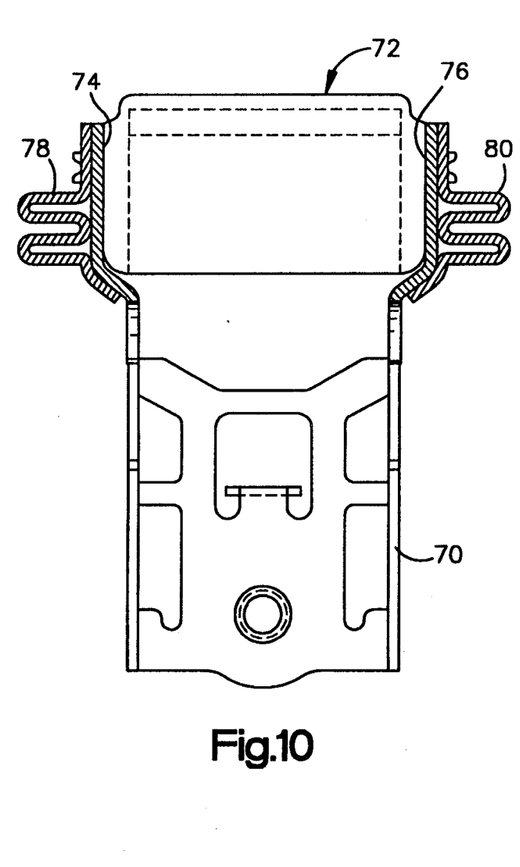
FIGS. 10 to 14 show further embodiments of the connecting means.

In FIG. 10, in plan view a belt reel housing 70, part of a webbing clamping means 72 and laterally disposed webs 74, 76 connecting these components are shown. The webs 74, 76 are so designed that they tear at a force between the webbing clamping means 72 and the belt reel housing 70 exceeding a threshold of for example 10-12 KN. Thereafter, elongation elements 78, 80 which engage laterally over each other and are folded together in a partial region are plastically elongated, permitting however a moving apart of the belt reel housing 70 and the webbing clamping means 72 only up to their stretching.

Figure 11:
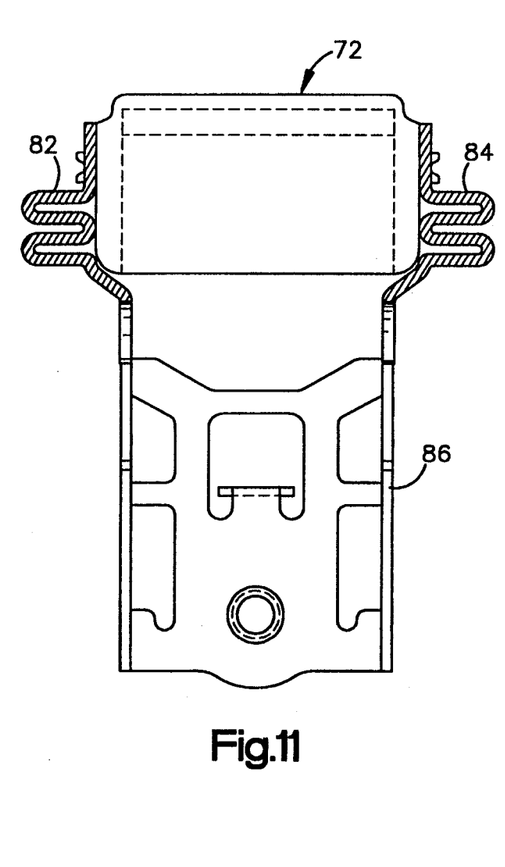

The embodiment according to FIG. 11 differs from that of FIG. 10 only in that webs defining a threshold value are not present and elongation elements 82, 84 are attached directly to the belt reel housing 86. The elongation elements 82, 84 may also be intregral extensions of the belt reel housing 86.

Figure 12:
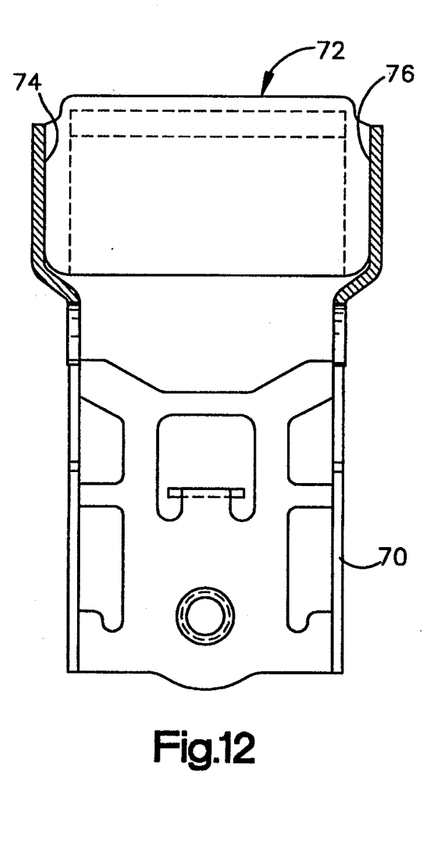

The embodiment according to FIG. 12 differs from that of FIG. 10 only in that there are no elongation members 87 and 80 and the webs 74, 76 yield by plastic deformation. The webs 74, 76 allow a determined removal of the webbing clamping means 12 from the belt retractor 10 if the force applied to the webbing 22 exceeds a predetermined value.

Figure 13:
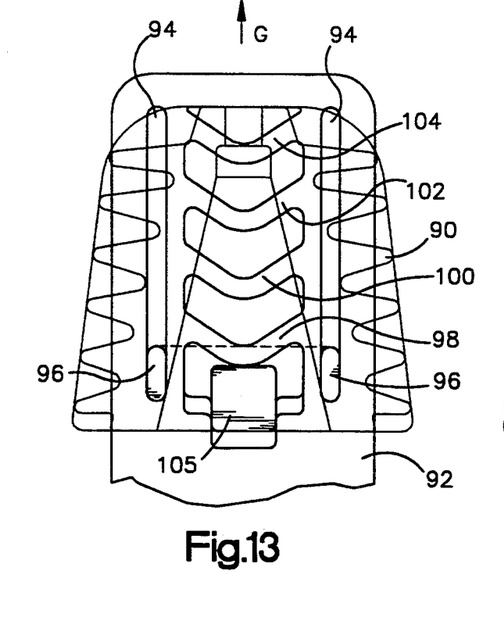
Figure 14:
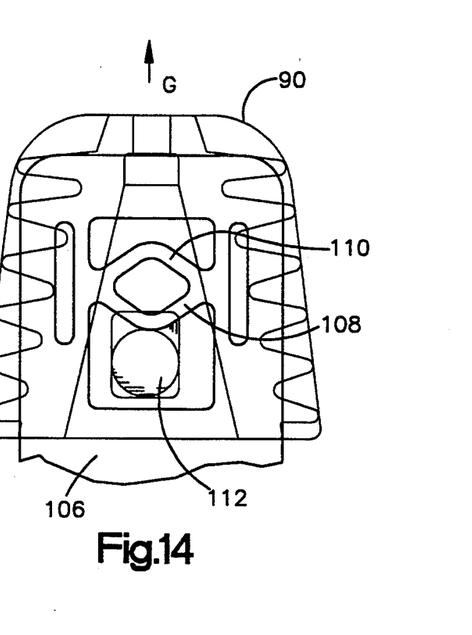

Further embodiments for plastically deformable connecting means can be seen in FIGS. 13 and 14 in which as a location aid in each case a webbing clamping means 90 corresponding to the webbing clamping means 12 of FIG. 1 is schematically illustrated. The loadbearing housing of the belt retractor is only partially illustrated in FIG. 13 in the form of a tab-like extension 92 of said housing. One or more such extensions 92 extend along a respective side of the webbing clamping means 90. Each extension 92 comprises slots 94 in which the webbing clamping means 90 is mounted movably in the belt withdrawal direction G by means of projecting pins 96. The extension 92 in FIG. 13 has four free webs 98, 100, 102, and 104 which extend transversely of the belt withdrawal direction G and are formed by material cutouts in the extension 92. The loadbearing housing of the webbing clamping means 90 comprises a nose 105 which projects into one of the cutouts in the extension 92 and in the belt withdrawal direction G is supported by the web 98. Under a load on the safety belt restraining system above a threshold value defined by the stiffness of the webs 98, 10, 102, 104 angled in the direction of the nose 105, the webs 98, 100, 102 and 104 deform plastically in succession, thereby allowing the webbing clamping means 90 to move in the belt withdrawal direction G with a dissipation of energy.

The embodiment according to FIG. 13 is designed for a movement of the webbing clamping means 90 through about 30 mm whilst the embodiment according to FIG. 14 is designed for a movement of the webbing clamping means 90 through about 10 mm. The embodiment according to FIG. 14 differs from that described above substantially in that a tab-like extension 106 of the belt retractor housing has two webs 108 and 110 which are angled in directions opposite to each other. As previously described, a nose 112 of the webbing clamping means 90 bears on the web 108.

The aforementioned advantages of the components of the safety belt restraining system, in particular the effectively increased ultimate load strength, the possibility of lightweight construction and the suitability as construction kit system, apply to a particular extent to the overall system when the belt retractor comprising yieldably mounted belt reel, the webbing clamping means comprising double wedge and the elastically deformable connecting means cooperate with each other in the manner described.

We claim:

1. A safety belt restraining system for vehicles, comprising a belt retractor with a frame and a webbing clamping means arranged downstream of said retractor, said clamping means having a housing and two clamping wedges which are arranged opposite each other in said housing on either side of the webbing, said clamping wedges having slide faces on their side remote from the webbing and bearing against support surfaces on the housing, and said wedges being movable jointly in vehicle-sensitive and/or webbing-sensitive manner out of a rest position and with their mutually opposite clamping faces in the direction towards a clamping position located in a direction corresponding to withdrawal of webbing from said retractor into engagement with the webbing, said belt retractor having a reel which is rotatably mounted in said frame and is blockable in vehicle-sensitive and/or webbing-sensitive manner, and said webbing clamping means being connected with the frame of said retractor by connecting means which yield with plastic deformation and permit a limited moving of the webbing clamping means away from the belt retractor when the force exerted on the webbing exceeds a predetermined value.

2. The safety belt restraining system according to claim 1, wherein said frame of the belt retractor and said housing of the webbing clamping means are connected by deformable webs.

3. The safety belt restraining system according to claim 2, wherein said deformable webs are arcuate and are joined to adjacent ends of said frame and said housing.

4. The safety belt restraining system according to claim 3, wherein said deformable webs have apex portions and are joined at said apex portions, said apex portions being dimensioned to break under a predetermined tensile stress.

5. The safety belt restraining system according to claim 1, wherein said frame of the belt retractor comprises a tab-like extension on which said housing of the webbing clamping means is mounted slidably in the belt withdrawal direction, said extension having at least one arcuate deformable web extending generally transversely of the belt withdrawal direction, and the housing of the webbing clamping means comprising at least one abutment member which bears against said web and plastically deforms said web when the housing of said webbing clamping means slides on said tab-like extension.

* * * * *